Nov. 1, 1932.  E. M. BARROWS  1,885,795
VEHICLE
Filed Jan. 3, 1931  2 Sheets-Sheet 1

Inventor
EARL M. BARROWS
ATTORNEYS

Nov. 1, 1932.  E. M. BARROWS  1,885,795
VEHICLE
Filed Jan. 3, 1931   2 Sheets-Sheet 2

Fig.7ᵃ

Inventor
EARL M. BARROWS

ATTORNEYS

Patented Nov. 1, 1932

1,885,795

UNITED STATES PATENT OFFICE

EARL M. BARROWS, OF MINNEAPOLIS, MINNESOTA

VEHICLE

Application filed January 3, 1931. Serial No. 506,446.

My invention relates generally to new and useful improvements in vehicles for transporting loads of all kinds, and more particularly relates to a new and improved vehicle for transporting and distributing and sifting dirt, compost, or other material over the surface of a golf green in such a manner that the material will be spread or distributed in an even layer on the surface to be covered.

To produce and maintain a fine turf for a golf green, lawn, or other purpose, it is usually necessary to treat the turfed surface from time to time with suitable materials such as soil, compost, sand fertilizer, or other materials, in order to produce a thick, even growth of grass capable of withstanding the usual wear to which such turfed surfaces are subjected. To thus treat a turfed surface has heretofore required considerable time and effort because of the inadequacy of the equipment now generally used for such purposes.

Many methods and devices are now used to transport and distribute these materials which usually are sifted by hand through a common screen, or by the use of more or less complicated machines; then transported and distributed by a shovel or by mechanical devices so as to obtain an even soil covering.

To expedite the operation of spreading a surfacing material over a turfed surface to be treated, it is desirable that means be provided whereby the surfacing material may be transported more easily, and the material be sifted and distributed more evenly and uniformly and in one operation, by a simple and easily operated device. The ground over which the material is to be transported is usually rough and uneven, at least in part, and ease of transportation is therefore a material consideration.

Further, it is desirable to provide a new and improved method of transporting a load of material by barrow, cart, or other vehicle, (materials used in the up-keep and care of turfs or for other uses) over rough and uneven surfaces without imparting any jars or shocks to the body of the vehicle, and it is an object of this invention to provide a vehicle which may be operated by man power with less effort, and by which loads may be transported over rough and uneven surfaces with less initial effort on the part of the operator because of the power required to lift a load over an obstruction being distributed over a longer period of time, and whereby a larger and heavier load may be transported with a saving in the power applied.

A further object of the invention is to provide a machine constructed in such a manner as to reduce to a minimum the power required to propel it over rough, uneven surfaces when loaded and having means for distributing and sifting the material in one operation which is simple and under the control of the operator so that an even covering may be had.

A further object is to provide an improved vehicle for transporting, sifting and distributing soil, compost, or other comminuted material, over turfs or other surfaces; and to provide an improved vehicle for transporting loads over uneven surfaces, thereby greatly expediting and simplifying the operation of sifting and distributing a turf-dressing material, and transporting a load over an uneven surface.

Other objects of the invention will appear from the following description and the accompanying drawings, and will be pointed out in the annexed claim.

In the accompanying drawings there is disclosed a structure designed to carry out the various objects of the invention but it is to be understood that the invention is not confined to the exact features shown as various changes may be made within the scope of the claim which follows.

In the drawings:

Figure 7a is a view diagrammatically illustrating the line of travel described by the load when the wheels of the vehicle pass over an obstruction such as shown in Figures 3 to 7;

Figure 11:
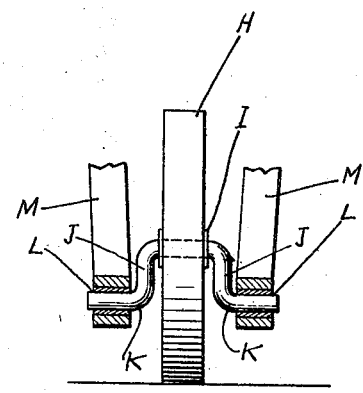
Figure 12:
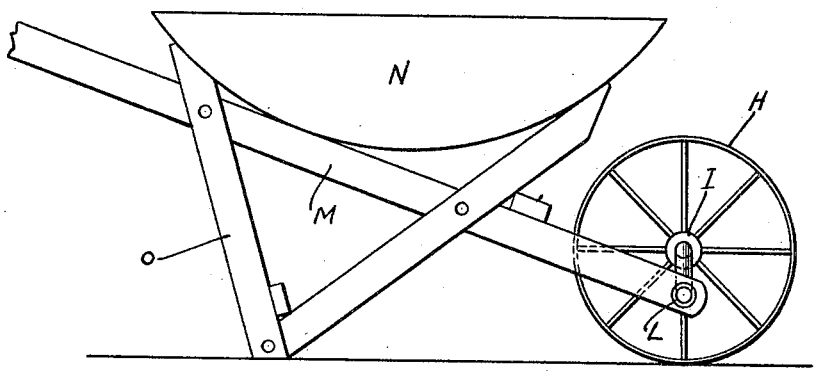
Figure 3:
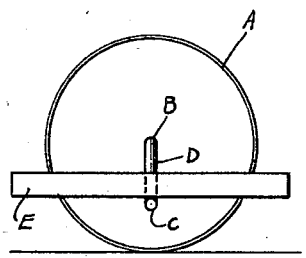
Figures 3 to 7 are diagrammatic views showing positions the various elements of the invention assume in passing from left to right up a step or sharp acclivity.
Figure 4:
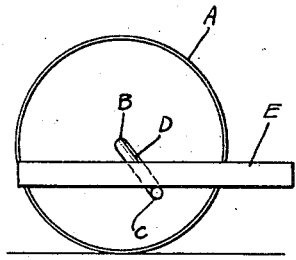
Figure 5:
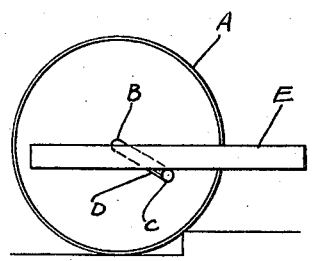
Figure 8:
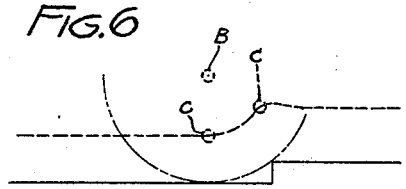
Figure 8:
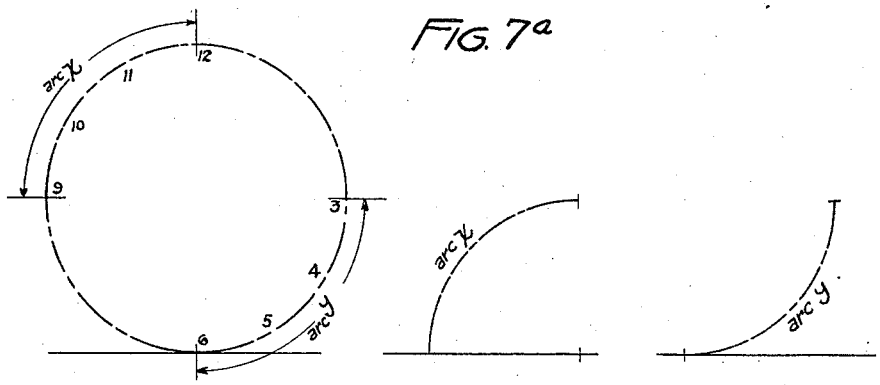
Figure 9:
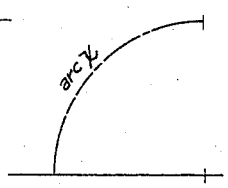
Figure 10:
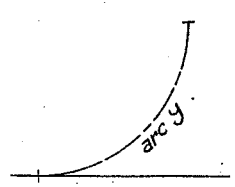

Figures 8, 9, and 10, are diagrammatic views illustrating the two forms of arcs that are described in the operation of the parts of the device;

Figure 11 is a front view showing the application of the invention to a wheel barrow; and Figure 12 is a side elevation of the same.

Figure 1:
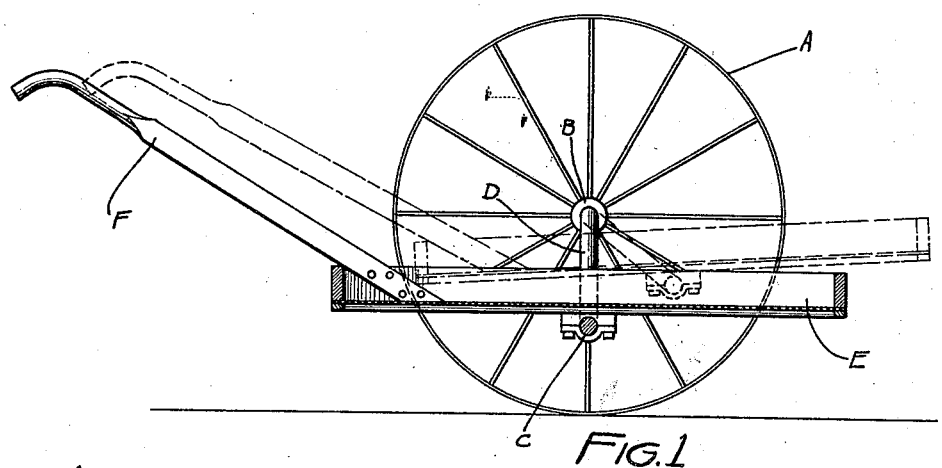
Figure 1 is a side elevation showing the invention embodied in the construction of a two-wheeled vehicle.
Figure 2:
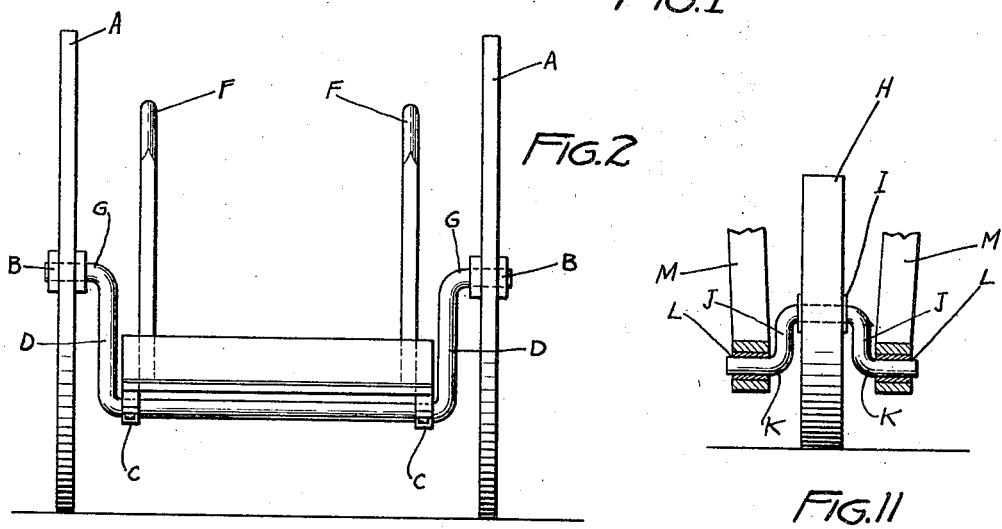
Figure 2 is a front elevation of Figure 1.

To illustrate the invention, I have shown in Figures 1 and 2, a box or body E, mounted by means of bearings C—C on an angled or crank axle G, of which the angled sections D are the links or levers between the two bearings C—C and the axle portions or wheel bearings B—B which support the wheels A—A. F—F represent the handles by which the vehicle is propelled. These handles are fixed to the body E so that the force of propulsion is applied through the bearings C—C and the levers D—D to the axle portions, and thence to the wheels A—A. Thus the body E can be swung back and forth on the eccentric bearings B—C, connected by the levers D—D, without relation to the movement of the wheels A—A on their axles B—B, or their progress over the ground. The bottom of the box or body E is perforated or in the form of a sieve with the holes small enough so that the material to be distributed will not drop through unless the box is swayed or shaken.

In operation the dirt or material to be sifted and distributed over the surface of turf or sand, is loaded into the box E, and wheeled or conveyed to the ground to be covered or top dressed. The vehicle is moved forwardly and at the same time the box is swayed or shaken by the operator so that the material is gradually sifted through the bottom of the box and deposited in an even layer over the surfaces to be treated. The amount of material distributed per foot of travel may be controlled by the skill of the operator in proportioning the swaying or shaking motion of the body E to the forward movement of the vehicle. The apparatus may be moved about from place to place without distributing any material by simply moving it forwardly without imparting an oscillatory and shaking motion to the body E, thereby making it possible to treat surfaces here and there with a single loading of the apparatus. By the employment of this novel apparatus, the material is sifted and distributed in one operation.

The construction of the vehicle also prevents the body E from being shaken or jarred when the wheels pass over rough ground or obstructions. As will be understood by reference to Figure 1, when the propelling force is applied through the bearings C—C, the body moves forward in relation to the wheels so that the bearings C—C are in advance of the axles B—B, and the levers D—D move forwardly from their normal perpendicular positions to the angular positions indicated in dotted lines in Figure 1, so that the lower ends of the levers D—D attached to bearings C—C are in advance of the axles of the upper axle portions B—B, the wheels A—A lagging behind because of inertia and friction. When the wheels strike an obstruction, this angle is increased, the body swinging forward and upward through an arc described by bearings C—C as they swing about the axis of the axle portions B—B. When a point of balance is reached, the wheels A—A, turning on the axles B—B, start to rise over the obstruction in an oppositely disposed arc, pivoting about the parts where the wheels meet the obstruction, with the radius of the wheel as the radius of the arc. As the obstruction is passed, the levers D—D move to normal position by the axis of the bearings C—C sinking and the axles B—B moving forward to a normal point of balance. Thus much of the jolt and jar of moving over rough ground is transformed into an easy swaying motion, the rising and falling of the body being slower, whereby the dirt or other material resting on the screen or sieve is not shaken through to a material extent.

In dropping off a level the action is reversed, the axles B—B moving over ahead of the bearings C—C. The invention may be applied to a cart or barrow by replacing the sieve with a box or cart body having a solid bottom, but retaining the eccentric or crank axles or bearings and retaining the propulsion through the eccentric bearings C—C.

The movement of the parts in progressing over a sudden acclivity or step in diagrammatically illustrated in part in Figures 3 to 7, and to simplify the explanation of the operation of the invention, the parts will be referred to as singular. When a step is encountered by the common type of cart or barrow with a single straight or fixed axle, the vehicle rises as a unit over the obstruction on the leverage of the radius of the wheel. The point where the wheel touches the step becomes the center of an arc through which the single axle rises to lift the load, the spoke of the wheel acting as the radius of the arc X. Considering the load as moving across the face of the clock from left to right, it is lifted in the direction of the quadrant, 9:00 o'clock to 12:00 o'clock represented in Figure 8 as arc X.

Figure 6:
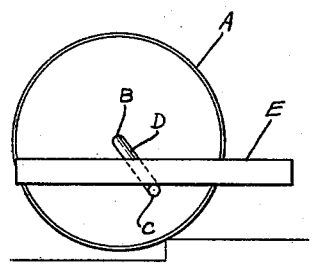
Figure 7:
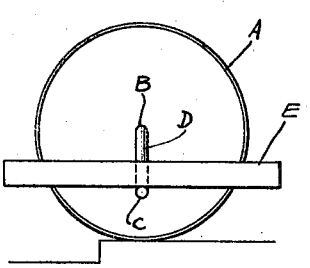

In my invention when the wheel A strikes an obstruction, it stops momentarily while the body and effective load impelled both by momentum and by the propelling force applied to the handle F rises in an arc described by the axis of the bearing C swinging about the axis of bearing B, the lever D acting as a radius. As the bearing C moves forward, the point of balance of the various forces, to wit, gravity, momentum and propulsion, move along the radius D in the direction from B to C; as diagrammatically illustrated in Figure 7ᵃ, and also shown in Figure 3. As an illustration, when the vehicle is at rest, the center of gravity is in a perpendicular line passing through the axes of B and C, but when the wheel A strikes an obstruction and the axis of C moves forward and upward to the position shown in Figure 5, it is obvious that the weight of the body E and its load has shifted to bearing C, and the wheel A has only to lift itself over the obstruction as indicated in Figure 6. In practice the shift of the point of balance along the lever D and the swing of the axis of bearing C continues only to the point where the wheel passes over the obstruction with the least resistance. Thus the necessary lifting of the vehicle over an obstruction is divided between two arc movements, a part of the weight being lifted by each.

When moving up a step or sharp acclivity, as shown in Figures 3 to 7, the length of time in which the total lift occurs is lengthened, thus lessening the amount of power required, though the amount of energy remains unaffected by these elements as so far described, and expedites the operation of the vehicle. In passing over an obstruction, which is theoretically a point, and returning to a former level which, in practice, is equivalent to the wheel passing over a pebble or other obstruction commonly encountered in the operation of a vehicle, the changing relation of the parts of my invention further expedite its operation, as follows:

In passing up a step to a higher level, the continuous progression of the bearing C without regard to the progression of the axle B, due to the propelling force being applied at that point, need not be taken into consideration. However, when the wheel passes over a point and returns to its former level, it becomes a vital element in the operation of the vehicle.

In the common operation of an ordinary vehicle, the wheels thereof progress almost continuously over a series of small obstacles such as pebbles, etc. The ordinary cart or barrow with a single rigid axle must be lifted in its entirety over each obstruction, thus, in passing over four quarter inch obstructions the vehicle is lifted a total of one inch. A vehicle constructed in accordance with my invention operates in a different manner, when passing over a series of small obstacles. When a vehicle embodying my invention starts to progress, the wheel, due to friction and inertia, lags behind as the bearing C moves forward in relation to axle B, thereby partially lifting the body and its load. This lift once made, is maintained as long as the vehicle continues forwardly. When the wheel strikes an obstruction which is no higher than the vertical lift of the body and load with respect to the axle B, resulting from the forward thrust being applied to bearing C, the load through momentum and inertia tends to stay in the horizontal plane of movement of bearing C. Thus in passing over an obstacle not greater than the original lift of bearing C when starting the vehicle, the wheel alone is lifted, thereby expediting the operation of the vehicle. As the wheel drops off the obstacle, the lever D becomes a pendulum with its axis at B and the bearing C, carrying the body and load, is swung back to its original lifted position without further expenditure of power. Thus, for example, if the original lift is one quarter inch, and four obstacles of one quarter inch are encountered, though the wheel is lifted a total of one inch, the body and the load is lifted only one quarter of an inch, thus expediting the operation of the vehicle.

In the operation of a vehicle with a single axle the entire load is lifted through the arc X which, reading across the clock face from left to right, is the arc of the clockwise quadrant from 9:00 o'clock to 12:00 o'clock. (Figure 8, arc X.) In my invention, the body and its load is lifted through the arc Y which, reading across the clock face from left to right, is the arc of the anti-clockwise quadrant 6:00 to 3:00 o'clock (Figure 8, arc Y).

In the ordinary vehicle with a single axle the entire load enters the arc of its rise over an obstacle at the point in the arc where the rise is greatest in proportion to its forward sweep. Thus the force of the momentum is thrown abruptly upward and its use as a lifting power largely wasted, the lift being accomplished more largely through the propelling force. In my invention, however, with its eccentric axles B and C, and the connecting lever D, a large part of the weight of the vehicle, to wit, the body and its effective load, enters the arc of its rise over an obstacle at the point in the arc where the rise is least in proportion to its forward sweep. Thus the momentum is gradually changed from a forward motion into an upward movement, thereby adding its force to the propelling force to aid in the necessary lift over an obstruction. Both power and energy are thus conserved and the operation of the vehicle expedited.

A further advantage accrues especially where a part of the load is carried by the operator as in the common wheel barrow, in that the changing relation of the parts and the eccentric axles change much of the jolt and jar of passing over rough ground into arc-like, or oscillatory, movements, thus lessening fatigue and expediting the operation of the vehicle.

In Figures 11 and 12 I have illustrated the application of the invention to a wheel barrow of the ordinary type, in which H is a single wheel, I the bearing therefor on the angled axle, J and K forming the levers between the bearing I of the wheel and the bearing L for the side rails M of the barrow N; the continuation of the rails M providing propulsion handles. This barrow is shown provided with the usual supporting legs O. With reference to Figures 1 and 2, it is to be understood that additional wheels may be used in connection with the cart or wagon body as, for example, the body E may be provided with four wheels.

Various other adaptations of the device will be apparent to anyone skilled in the art, and hence I do not wish to be confined to the particular manner of applying the invention as shown and described herein.

I claim as my invention:

An apparatus for transporting compost or other comminuted materials over a golf course and sifting it on the greens, said apparatus comprising an axle having crank end portions, two relatively large carrying wheels rotatively mounted on said cranks whereby the axle is pendently supported between said wheels, a sifter pivotally mounted upon the axle and substantially balanced thereon, handles rigidly secured to said sifter at one side of the axle adapted to act as levers to raise and lower the rear and front portions of the sifter and to propel and guide the apparatus, the handles projecting lengthwise of the sifter and beyond the end of the same whereby the sifter may be conveniently swung back and forth during the sifting operation about the axis of said wheels and whereby the ends of the sifter may be raised and lowered to maintain the material over the bottom of the sifter and sift it on the greens by a to and fro motion as well as by a tilting or a leveling motion of the ends of the sifter.

In witness whereof, I have hereunto set my hand this 27th day of December 1930.

EARL M. BARROWS.